United States Patent [19]
Parker

[11] Patent Number: 5,981,906
[45] Date of Patent: *Nov. 9, 1999

[54] METHOD OF WELDING THE ENDS OF PIPE TOGETHER USING DUAL WELDING WIRES

[75] Inventor: William David Parker, Tulsa, Okla.

[73] Assignee: Lincoln Global, Inc., Cleveland, Ohio

[ * ] Notice: This patent is subject to a terminal disclaimer.

[21] Appl. No.: 08/936,883

[22] Filed: Sep. 25, 1997

Related U.S. Application Data

[63] Continuation-in-part of application No. 08/514,450, Aug. 11, 1995, Pat. No. 5,676,857.

[51] Int. Cl.$^6$ .................................................. B23K 9/12
[52] U.S. Cl. .................................. 219/137 PS; 219/60 R; 219/61; 219/137.7
[58] Field of Search ...................................... 219/61, 60 R, 219/125.11, 137.2, 137.7, 137.71, 74, 136, 137 PS, 76.14

[56] References Cited

U.S. PATENT DOCUMENTS

| | | | |
|---|---|---|---|
| 2,654,015 | 9/1953 | Landis et al. | 219/73 |
| 2,658,162 | 11/1953 | Tichenor et al. | 219/76.14 |
| 3,007,033 | 10/1961 | Newman et al. | 219/137.2 |
| 4,144,992 | 3/1979 | Omae et al. | |
| 4,273,988 | 6/1981 | Iceland et al. | |
| 5,227,601 | 7/1993 | Black | 219/61 |
| 5,676,857 | 10/1997 | Parker | 219/61 |

FOREIGN PATENT DOCUMENTS

| | | |
|---|---|---|
| 566212A1 | 10/1993 | European Pat. Off. . |
| 605879A1 | 7/1994 | European Pat. Off. . |
| 270410622A1 | 5/1978 | Germany . |

OTHER PUBLICATIONS

"Understanding Inventers," *Welding and Metal Fabrication*, Vol. 64, No. 2 February 1996.
"Automatic Welding Systems Inc., Houstan, Texas, The Gold Line" broucher.
"A New,Low-Spatter Arc Welding Machine," Elliot K. Stava, *Welding Journal*

*Primary Examiner*—Clifford C. Shaw
*Attorney, Agent, or Firm*—Vickers, Daniels & Young

[57] ABSTRACT

A new system for welding sections of pipe together to form a long, continuous pipeline. A welding bug is mounted on a guide track which goes around the circumference of the pipe. The welding bug is provided with a wire feeder, a motor to drive the wire feeder, and driving motor for driving the bug around the track. One may vary the speed of the bug and the wire feeder while the bug is continuously driven around the track. The welding head on the welding bug is powered by a surface-tension-transfer power source. The initial or root pass is made external of the pipe. In one embodiment there is a dual welding wire feeder for driving two welding wires simultaneously at the same speed.

78 Claims, 12 Drawing Sheets

METHOD OF WELDING THE ENDS OF PIPE TOGETHER USING DUAL WELDING WIRES

CROSS REFERENCE TO RELATED APPLICATION

This application is a continuation-in-part of allowed patent application Ser. No. 08/514,450, filed Aug. 11, 1995 "Method of Welding the End of a First Pipe to the End of a Second Pipe, William D. Parker, Inventor now U.S. Pat. No. 5,676,857.

BACKGROUND OF THE INVENTION

1. Field of the Invention

This invention relates to the field of welding sections of pipe together to form a long, continuous pipeline. It relates especially to a system whereby the welding is done with machines.

2. Background of the Invention

One of the major systems for transporting products such as oil, gas, and water, is by the use of pipelines. These pipelines are usually laid underground and literally crisscross the United States and many other countries. A trench is normally dug by ditch diggers along the prescribed route of the pipeline.

Sections of pipe, e.g. 30 to 60 feet or so, are hauled into the area through which the pipeline is being laid. Ends of adjacent joints of pipe are connected by welding. These welds must be very precise. Even little pinholes in the weld cannot be tolerated. The ends of the pipe are normally beveled to improve the welding. These pipes are clamped together to get as good an alignment between the two sections of pipe as possible. On the inside of the pipe at the welding joints the welding material should form a rather smooth surface next to the interior of the pipe. In any event, the weld on the inside of the pipe should have very little protrusion. Excessive protrusion can cause all sorts of problems when one runs apparatuses down inside the pipe, such as apparatus useful to detect any possible flaw which may have developed in the pipeline. Also, introduced in the pipelines are pipeline pigs which separate one product present in a pipeline from a second. It should be understood that sometimes gasoline will be piped through a pipeline. A plug will be put in to separate the two products, and then crude oil will then be pumped through the same pipe. One must maintain a consistent separation of the two materials.

In order to prevent the protrusion of welded molten welding material into the inside of a pipe, the more common practice today is to make the first or root pass of the weld from inside the pipe. Special elaborate, costly machines are commercially available for this purpose. The cost of renting such elaborate, equipment for working on the inside of a three foot (3') diameter pipe may be as much as $1,200.00 per weld, or the rental could be nearly Two Million Dollars per month. This is a very time-consuming and costly welding procedure. It is seen that there is a need for a better, less expensive way of welding pipe sections together.

In modern pipeline welding, welding bugs are sometimes used as semi-automatic welding machines. In conjunction with the welding bug is a track which is secured about the periphery of the pipe at the point it is desired for the welding bug to rotate around the pipe. The bug has a drive motor which with the help of rollers, drives the bug around the track. The rollers hold the welding bug along the track, even when the welding bug is nearly upside down. Special clamping means are provided to secure the bug to the track. Means are also provided to accommodate different size pipe. The welding bug normally has an oscillator to cause the welding tip to oscillate across the welding puddle.

The bug also has a wire feeder which has a motor which drives the wire through the welding head for the actual welding of the two sections of pipe together.

In operation, the drive motor drives the bug around the track at a selected constant rate of speed. However, when the bug is traveling from 12 o'clock, which is the top of the pipe, to about 9 o'clock, which is midway around, the speed is constant. However, for the balance of the down movement of the welding bug to 6 o'clock, the movement must be speeded up because of the gravity pulling the puddle at a faster rate. In order to accommodate this, in current practice, the bug drive motor is stopped. Then the operator will adjust the speed of the drive motor so that it will be speeded up. He then starts the drive motor, and the welding process continues. The movement of the bug is always stopped when making this change in speed.

Stopping the drive motor causes a loss of time in completing the weld. Other associated problems such as maintaining the continuity of the bead must be considered. However, even with these problems, the procedure just discussed is widely used, mainly because it is better than the prior procedures.

It is therefore one object of this invention to provide an apparatus and system whereby the initial or root welding pass can be made from outside the pipe in which there is no internal protrusion of the welding puddle and in which there is an improved welding system.

SUMMARY OF THE INVENTION

This is a method and an apparatus of welding the end of a first pipe section to the end of a second pipe second by use of an improved welding bug. The welding bug is provided with a wire feeder, means to drive the wire feeder, and driving means for driving the bug around a track on the outside of a periphery of pipe. Control means are provided for varying the speed of the bug while the bug is continuously driven around the track. When the pipe is welded, it is in a horizontal position, that is, the axis of the pipe is normally horizontal. The initial welding pass or root pass is applied adjacent to the ends of the first and second pipe from outside the first and second pipe. No internal line-up clamps with backup shoes are used or needed in this process.

Normally two bugs are used, one around one-half of the track and the other around approximately the other half. From 12 o'clock to 9 o'clock one bug goes from nearly horizontal to nearly vertical. During this time the speed of the bug must be varied so as to keep the electrode with the welding wire just ahead of the welding puddle. The other bug moves from 12 o'clock, through 3 o'clock, to 6 o'clock. The two bugs are rotating or moving at the same time. However, one bug will start slightly before the other and one will stop slightly before the other and be removed from that immediate area so there is a continuous weld where the welding passes from the two bugs meet. In the root pass a surface tension transfer (STT) power source is used. This is new in this combination. By using this system with proper bug speed and welding wire speed, there is only a slight burn through on each edge of the bevel. The surface tension of the welding mode causes it to blend together, tying in each side of the bevel leaving a small flat weld on the interior of the pipe. Thus, the need to run the initial or root pass from the inside of the pipe, or use equipment inside the pipe is no longer necessary. Before this invention when welding pipe together with systems involving welding bugs, the root or initial pass was always from the inside or involved placing equipment such as clamps, back-up shoes, etc. inside the pipe. No such equipment is needed with this invention.

In yet another embodiment a dual wire feeder is used, one welding wire is directed to the end of the first pipe and the other welding wire is directed to the end of the second pipe. Means are provided so that one wire feeder motor simultaneously drives both wires. Means are also provided for varying the speed of the wire feeder so that there is the desired amount of each of the two wires being fed into the welding puddle. In another embodiment the speed of the wire feeder drive is controlled by and varies in accordance with varying the speed of the drive motor for the bug such that the desired rate of feeding the wire or wires is achieved.

In operation, the welding operator will continuously observe the welding puddle in relation to the electrode or the end of the welding wire being fed. The operator will want to keep the end of the welding wire just ahead of the puddle. Therefore, the operator will vary the speed of the bug to maintain the proper position of the welding head. This is done while the bug and welding operation proceeds with no stops required. During the actual movement of the welding bug, the wire feed drives can be varied to get the desired amount of welding wire to the electrode. Further, if desired, a control can be made such that the wire feeder speed will vary in accordance with the speed of the welding bug.

DESCRIPTION OF THE PREFERRED EMBODIMENT

Figure 1:
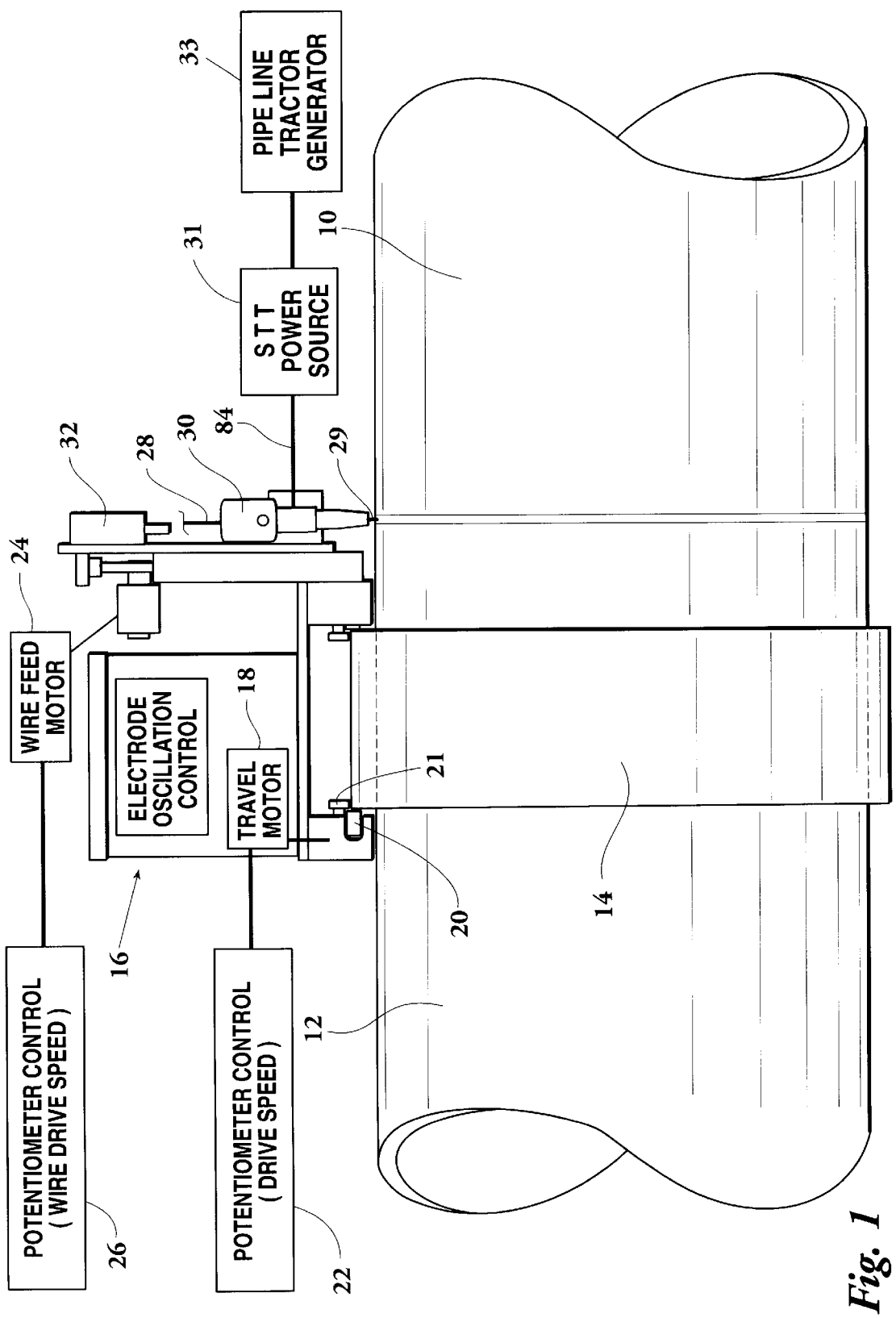
FIG. 1 is a schematic drawing illustrating key components of the invention.

Attention is first directed to FIG. 1 which is a schematic drawing showing the key components of a welding system using a modified welding bug. Shown thereon is a first pipe joint 10 and second pipe joint 12 which are to be welded together. A guide track 14 is positioned and secured to the outside of the welding pipe near the position where the pipe ends are to be welded. It is upon this guide track that the welding bug 16 travels. There will normally be two welding bugs, but only one is shown. Position or guide bearings or rollers 20 maintain the welding bug on track 14 as the bug travels thereon. There is a travel motor 18 in the welding bug which drives knurled travel rollers 21 about the track 14. The speed of the travel motor is controlled by a potentiometer control 22.

A welding head 30 is supported from the welding bug 16 and supports a welding wire 28 which extends through the welding head 30 as the electrode 29. (In one embodiment described later, there are dual welding wires which are used with the welding bug and wire feed motor 24.) A track 14 is positioned on pipe 12 so that the end of welding wire 28 is properly positioned with respect to the ends of the pipes 10 and 12. A $CO_2$ solenoid valve 32 is supported from the welding bug 16 and provides $CO_2$ or other desired gas to be expelled at the lower end of the welding head 30 about the end of the welding wire tip 29.

In operation of the device in FIG. 1, the $CO_2$ solenoid is first opened so that all other gas is flushed out from around the electrode 29 before it is supplied with electrical power. The power for welding head 30 is provided via conduit 84 from surface-tension-transfer power source 31 which will be explained further as a new type power source for the automatic welding system using a welding bug. This STT power source is now started.

Next the wire feed motor 24 and the welding bug travel motor 18 are simultaneously started. This causes the welding bug 16 to start moving along track 14. The operator watches the operation, especially the welding puddle. The speed of the welding bug should be such that the wire tip 29 (or tips if dual welding wires are used) should just maintain itself in advance of the puddle. As the welding bug goes around the pipe, the gravity varies the movement of the puddle. The operator will compensate for this by operating potentiometer control to change the drive speed 22 speed while the welding is in progress. If the wire feed motor is not feeding the wire sufficiently fast, then potentiometer control 26 for wire drive speed can be increased or, if the situation demands, it can be decreased. This too is done while the welding bug 16 is moving along track 14. (Never before has the speed of the welding bug along the track been varied while the welding is actually taking place.)

Figure 11:
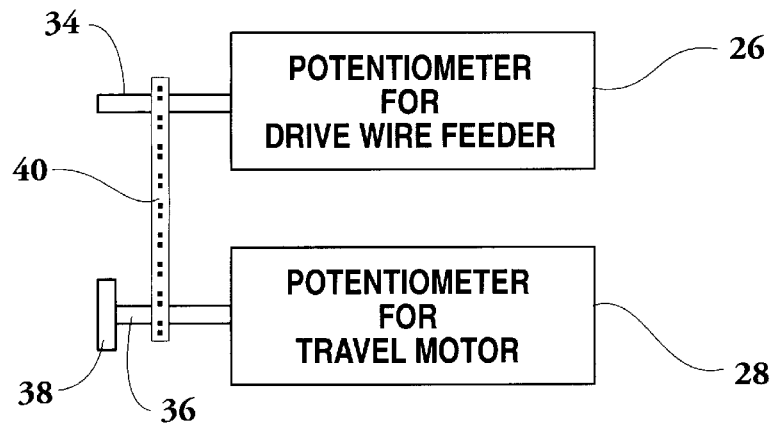
FIG. 11 illustrates the connection between a potentiometer for driving the wire feeder and the potentiometer for the travel motor such that the drive wire feeder is adjusted in accordance with the change of the travel speed of the welding bug.

Instead of controlling the drive speed of the travel motor 18 independently from the speed of wire feed motor 24, one may make the wire feed motor speed a function of the speed of the travel motor. This apparatus for permitting this is illustrated in FIG. 11. In this apparatus the operator of the welding bug would turn knob 38 to adjust the travel speed of the welding bug. This change would be in the general manner of changing potentiometer settings for controlling the speed of a motor. In this case, there is a drive chain or belt 40 connected between the shafts or rotor 34 of potentiometer for drive wire feeder 26 and the rotor 36 for potentiometer for travel motor 28. Thus when wheel 38 is rotated, the drive chain 40 will drive the rotor 34 to adjust the potentiometer for drive wire feeder 26. Thus, as the speed of the welding bug varies, the speed of the drive wire feeder can vary accordingly.

A pipeline tractor 33 has a generator which provides electrical power to the surface-tension-transfer (STT) power source 37. In principle, the STT power source is a power source which has the capability of delivering and changing electrode current in the order of microseconds, for example about 750 microseconds has been effective. The STT power source is commercially available from the Lincoln Electric Company, Cleveland, Ohio 44117-1199, U.S.A.

Figure 2:
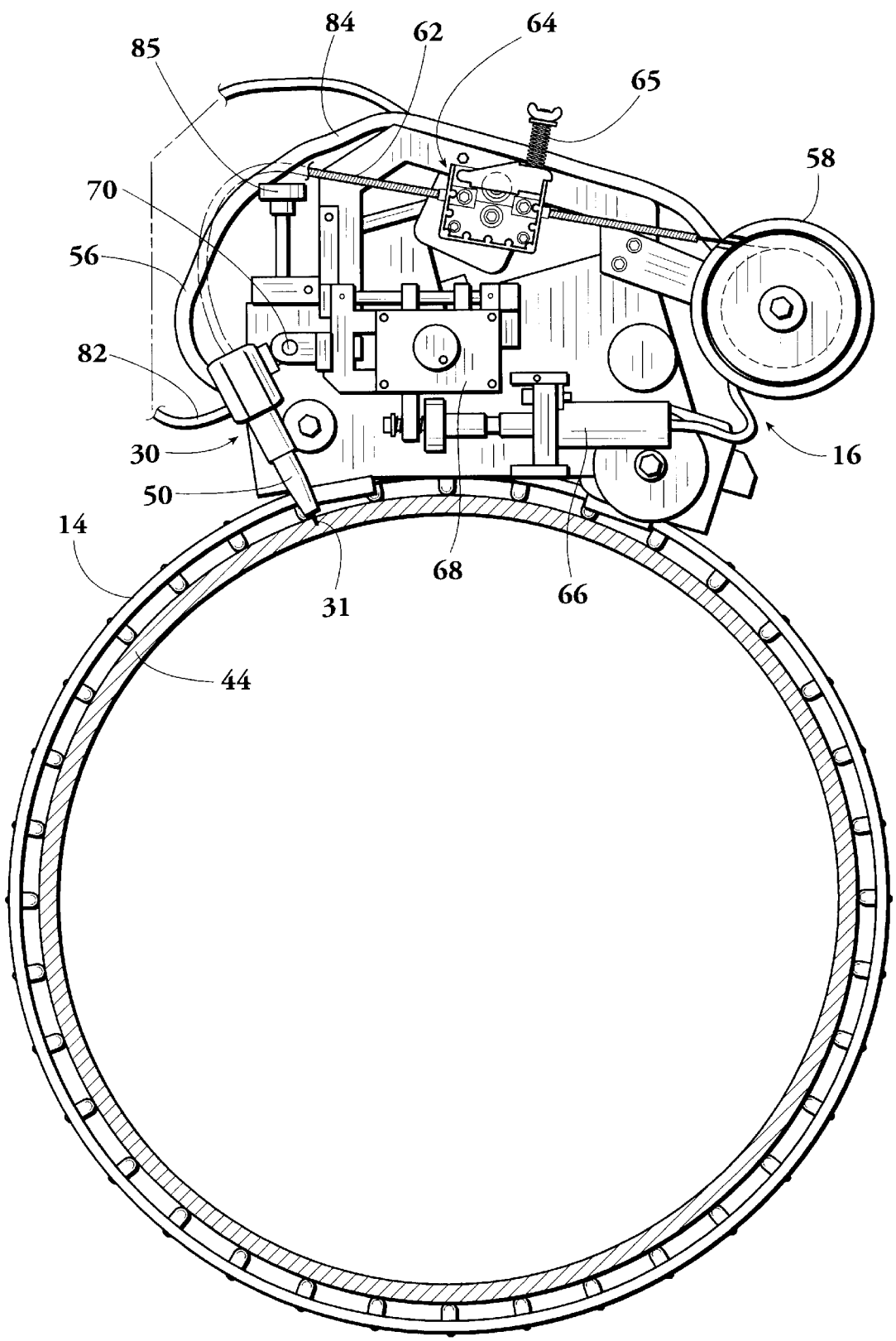
FIG. 2 illustrates a welding bug mounted on a track showing a piece of pipe which is to be welded to another piece.

Attention is next directed to FIG. 2 which shows a modified welding bug 16 mounted upon track 14 which encircles the pipe 44. Track 14 may be a conventional track which guides a welding bug around pipe. The principal components of welding bug 16 include a welding tip or electrode 31 at welding head having a gas cone 50 which directs welding gas, typically $CO_2$, about the electrode 31. Conduit 84 connects STT power source 31 to welding head 30. The welding wire, which is an electrode, is wound on wire reel 58, passes through shield 60 and 62, with a wire feeder 64 between the two shields. The wire feeder shown here in FIG. 2 may be conventional and has tension adjustment 65. This wire feeder 64 is used to drive a wire at a selected speed through the welding head 30. $CO_2$ supply hose 82 connects the welding head 30 in a conventional manner. An oscillating motor 66 is provided to drive oscillating mechanism 68 which is connected through connector 70 to oscillate the welding head 30 so that the electrode is moved back and forth across the opening between the ends of the pipe being welded. Connector 70 can be used to adjust the positioning of welding head 30. Knob 85 is used for adjusting the height of the welding head.

Figure 3:
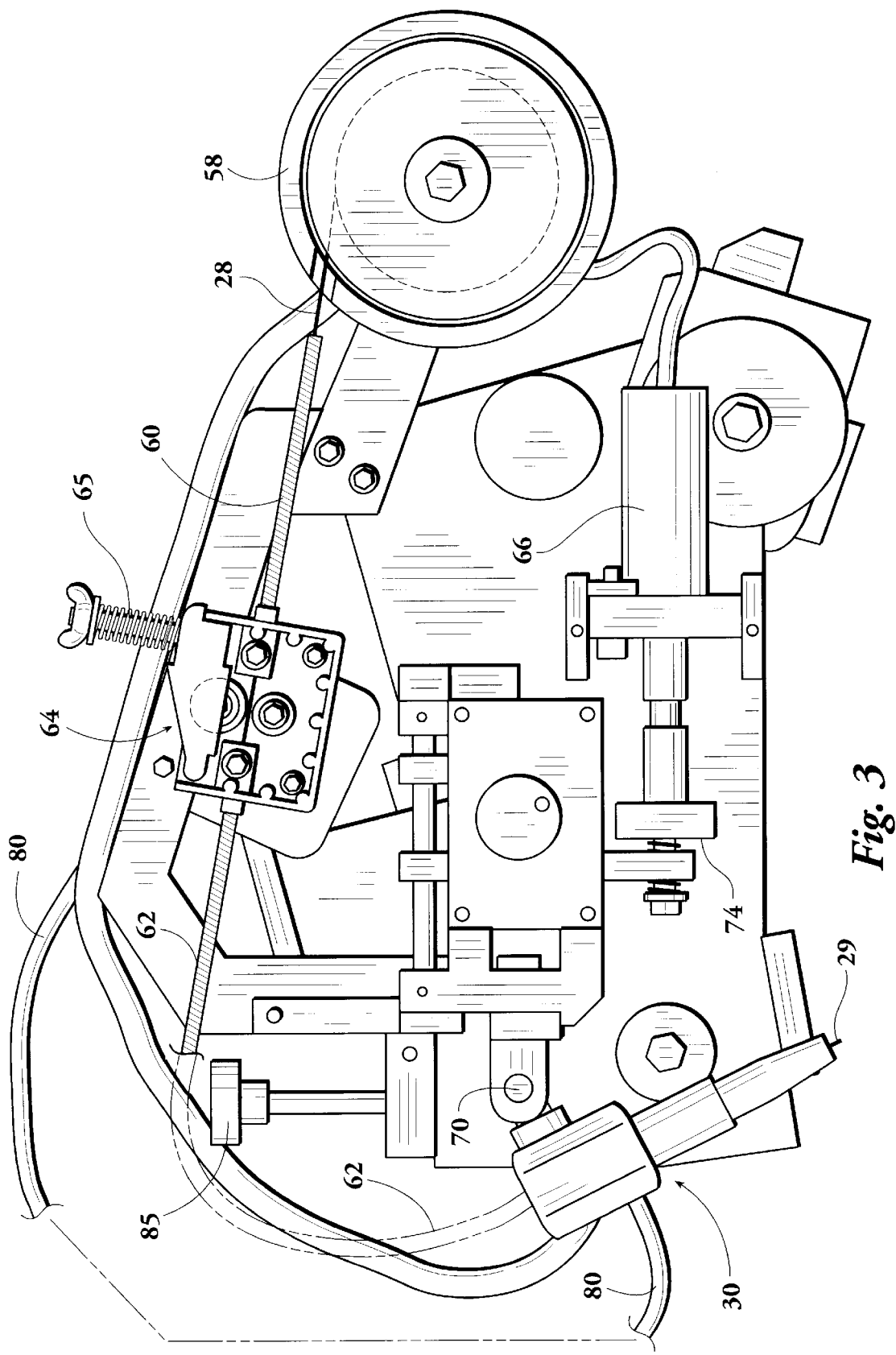
FIG. 3 is a front elevation of the welding bug of FIG. 2.

Attention is now best directed to FIG. 3 which shows the welding bug 16 in enlarged form. It shows an oscillator adjusting mechanism 74 to adjust the height of the oscillation curve, i.e. the width of oscillation. (This oscillating system may be the same as shown as used on conventional welding bugs.)

Figure 9:
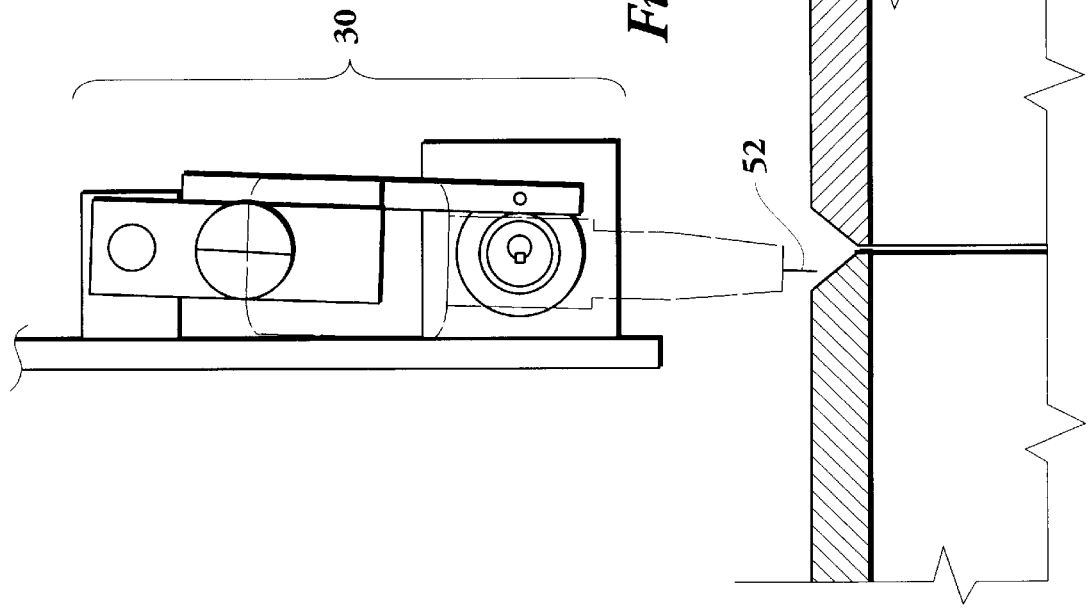
FIGS. 8 and 9 when taken together show, in one embodiment, the wobble of the welding head.
Figure 8:
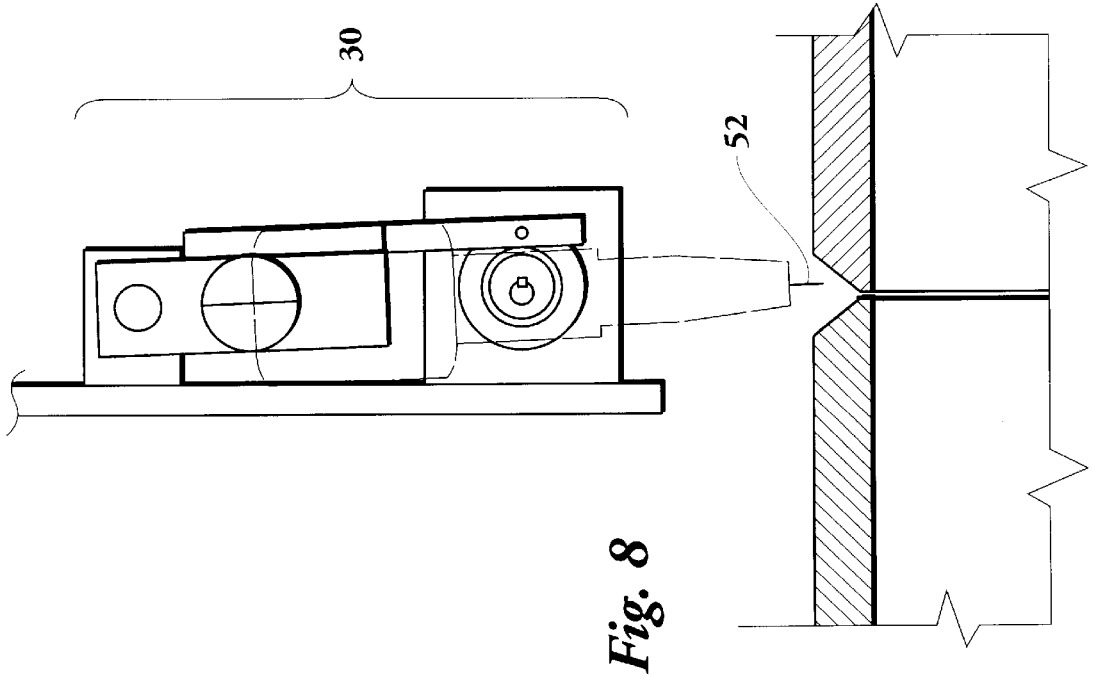

Attention is next directed to FIG. 8 which shows oscillator tip in one position and in FIG. 9 wherein the welding tip is in a second position. The welding tip 52 is supported by welding head 30. This oscillating system is used in the conventional welding bugs and is shown here only for ease of understanding the overall system. The oscillation system is not needed when welding with two welding wires as described herein, especially in relation to FIGS. 14, 15, 16 and 17.

FIG. 3 also shows an adjustment knob 85 for adjusting the height of the welding head with respect to the welding bug and in effect the height in relation to the pipe being welded.

Figure 4:
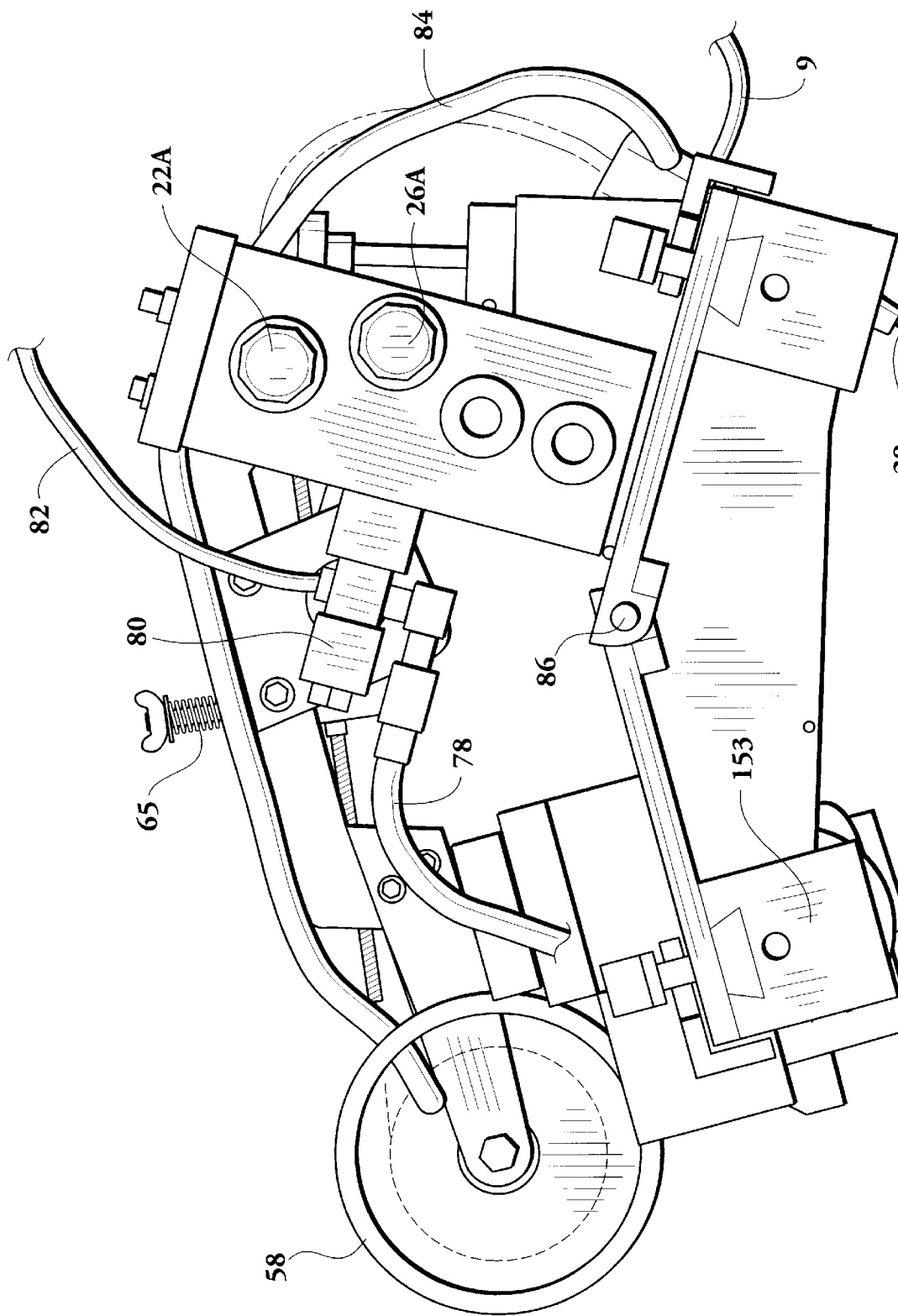
FIG. 4 is a rear elevation of the welding bug of FIG. 3.

It is essential to provide an inert gas which is preferably carbon dioxide to the welding head. This is provided as shown in FIG. 4 from a gas source hose 78 which is connected to a solenoid valve 80 which has an outlet hose 82 which goes to the welding head. Gas is provided through the solenoid when it is opened. A power conduit 84 from the STT power source 31 provides the operating current for welding head 30.

A variable swivel adjustment 86 provides means for adjusting the angle of the welding head as may be needed.

Figure 6:
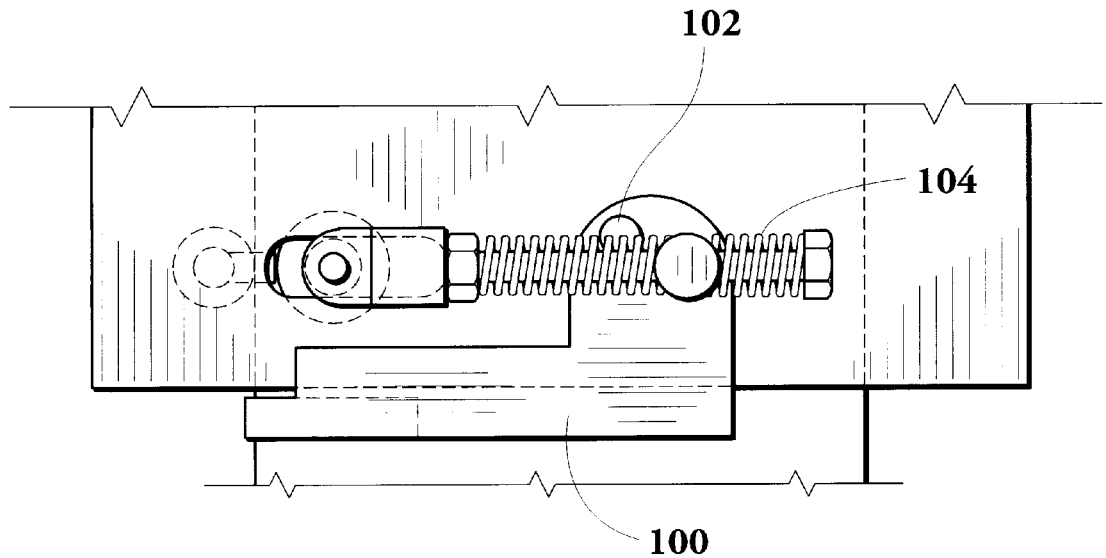
FIG. 6 illustrates clamping means for releasably clamping the guide rollers and travel drive rollers of the bug to the guide track.
Figure 7:
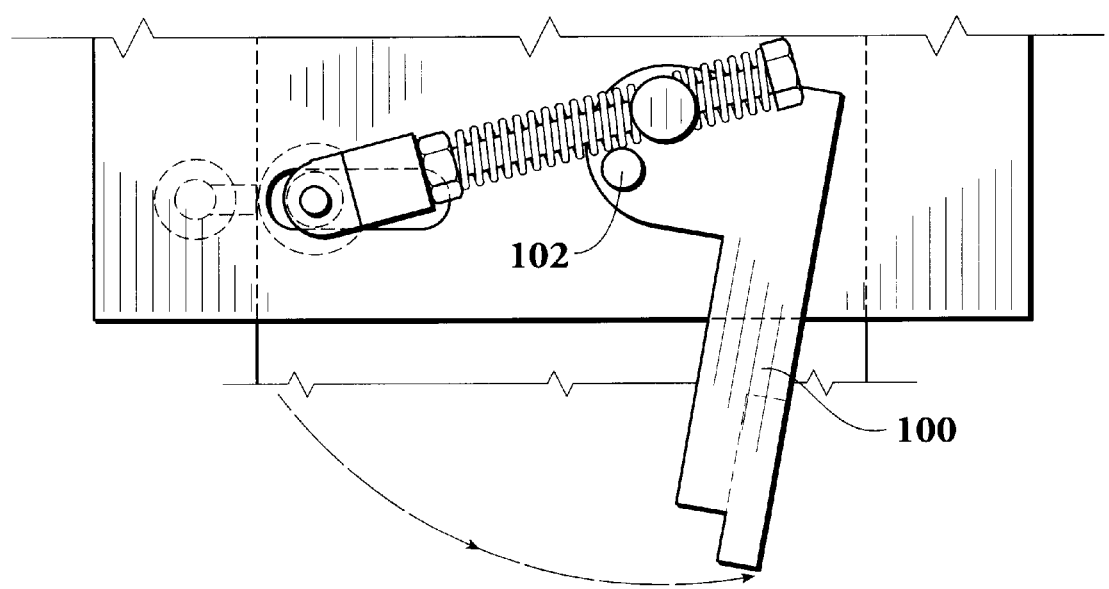
FIG. 7 is similar to FIG. 6 except that the clamp is illustrated in the disengaged position.
Figure 10:
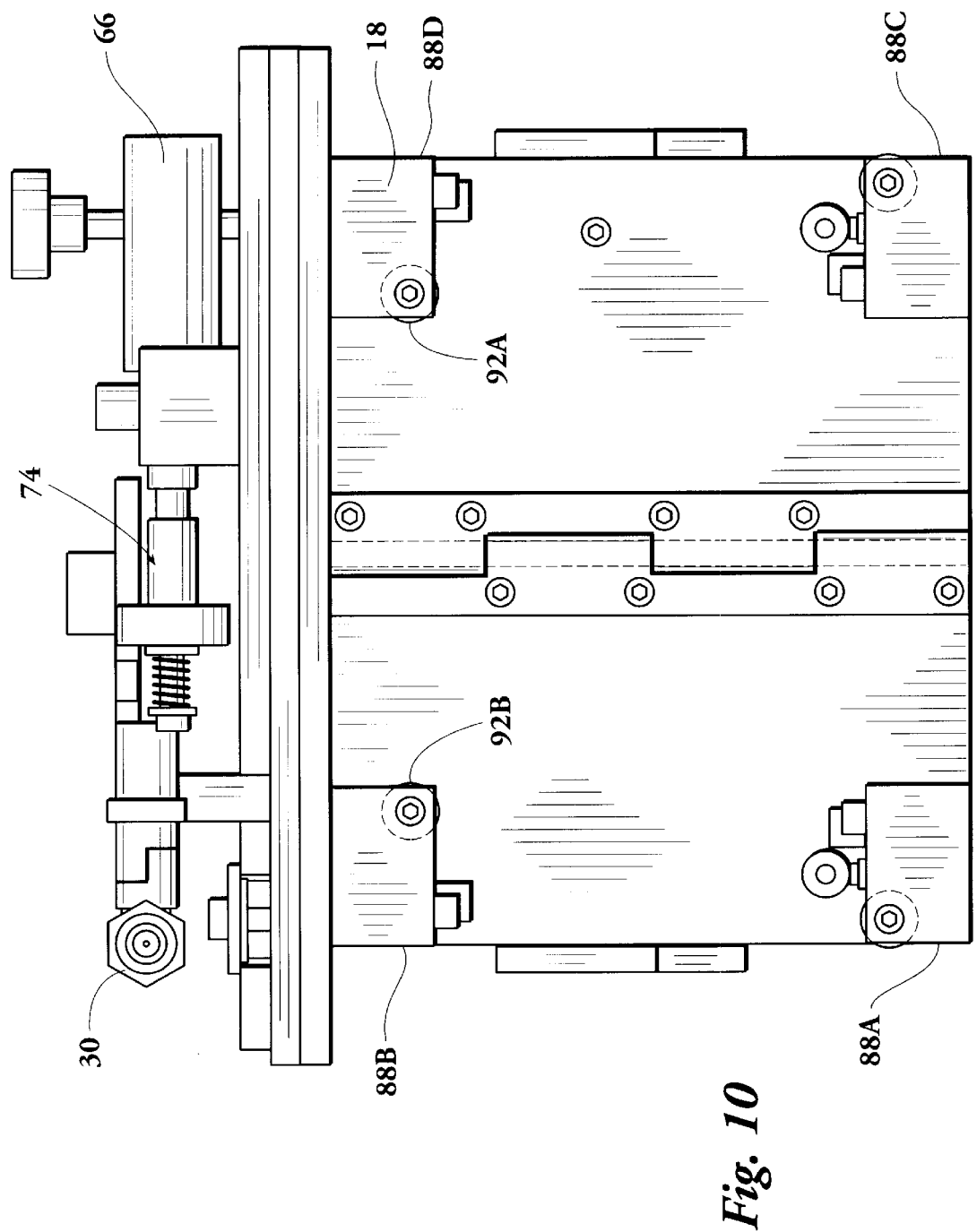
FIG. 10 illustrates the bottom view of the welding bug.

Attention will next be directed to the travel motor 18 and travel and drive rollers 20 as they relate to staying on and moving along track 14. Travel and drive rollers may be conventional and are shown here to complete the overall new combination. Attention is next directed to FIGS. 6, 7, and 10. FIG. 10 is a bottom view of the welding bug 16. Shown thereon are blocks for housings 88A, 88B, 88C, and 88D for the rollers. Shown within the blocks 88A and 88C are the side rollers 90; and in blocks 88B and 88D are shown knurled wheels 92A and 92B which are driven by drive motor 18. The side rollers keep the welding bug snug on the track. The knurled roller causes the welding bug to move along the track. FIGS. 6 and 7 show the clamping lever for clamping the rollers in position. FIG. 7 shows a clamping mechanism disengaged so that the rollers can be properly positioned. The rollers should be snug against the track band. Thus there is provided a spring and adjusting nuts 104.

Figure 5:
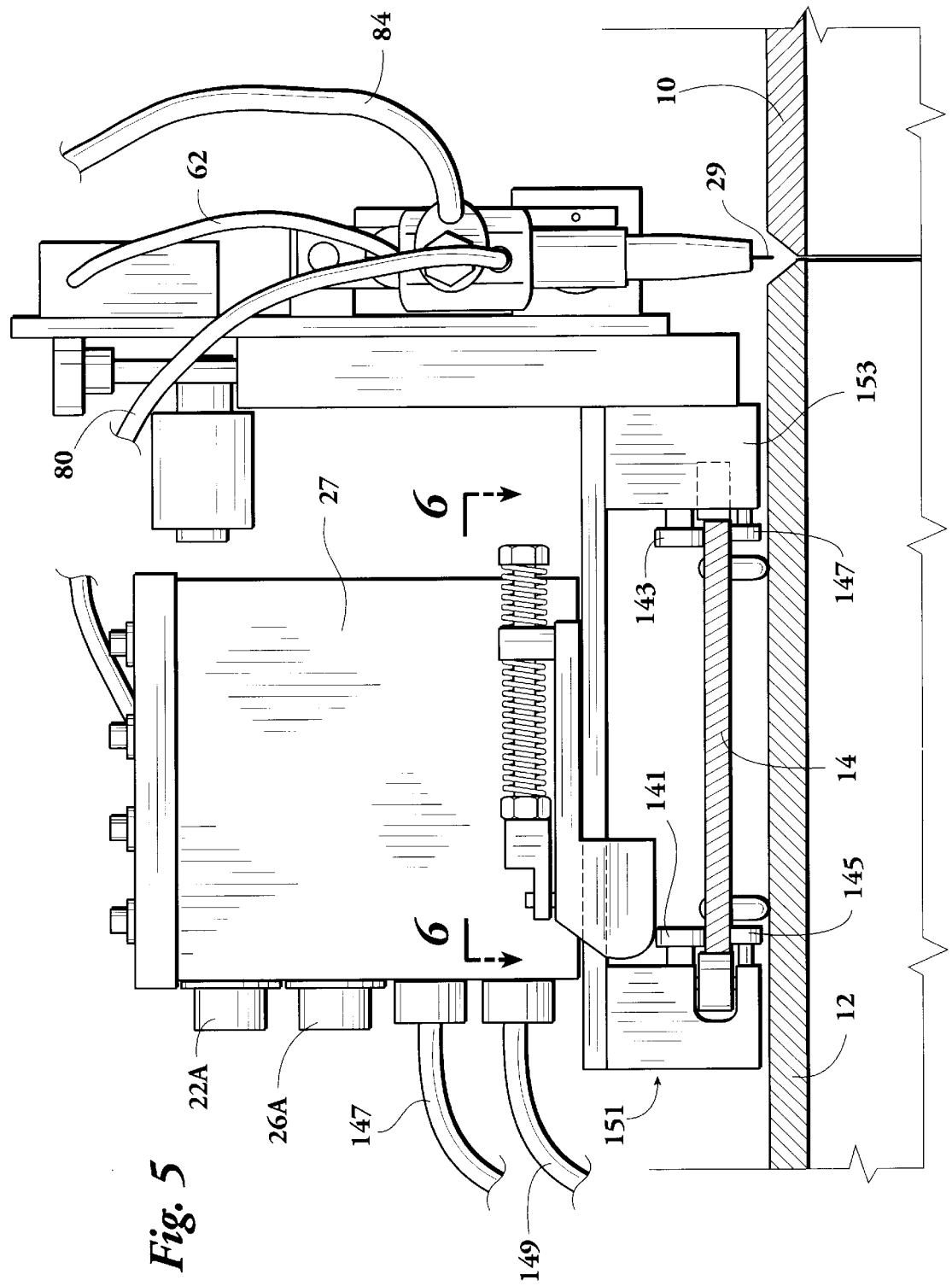
FIG. 5 is a left-side evaluation of portions of the welding bug of FIG. 4.

As shown in FIG. 5, support bearings 141 and 143 on top of track 14 and bearings 145 and 147 on the bottom of track 14 keep the welding bug 16 in contact with track 14.

Also shown in FIG. 10 are: Bottom view of the welding head 30, oscillator drive motor 66, and oscillator adjustment 74.

The wire guide mechanism has been modified from that of the previous wire drive systems on conventional welding bugs. Conventional welding bugs require the bug to be stopped before a change of speed of the wire feed motor or drive motor for the bug was made. In this invention, a modification has been made such that the drive speed of the welding wire or wires can be changed without stopping the movement of the welding bug. The drive mechanism for driving the welding bug about tracks 14 has been modified from that of the conventional welding bugs mostly in that the speed of the travel motor can be varied without stopping the welding process.

Control means for controlling the speed of the bug travel motor and the speed of the wire drive motor 24 will now be discussed in relation to FIGS. 12 and 13.

Figure 12:
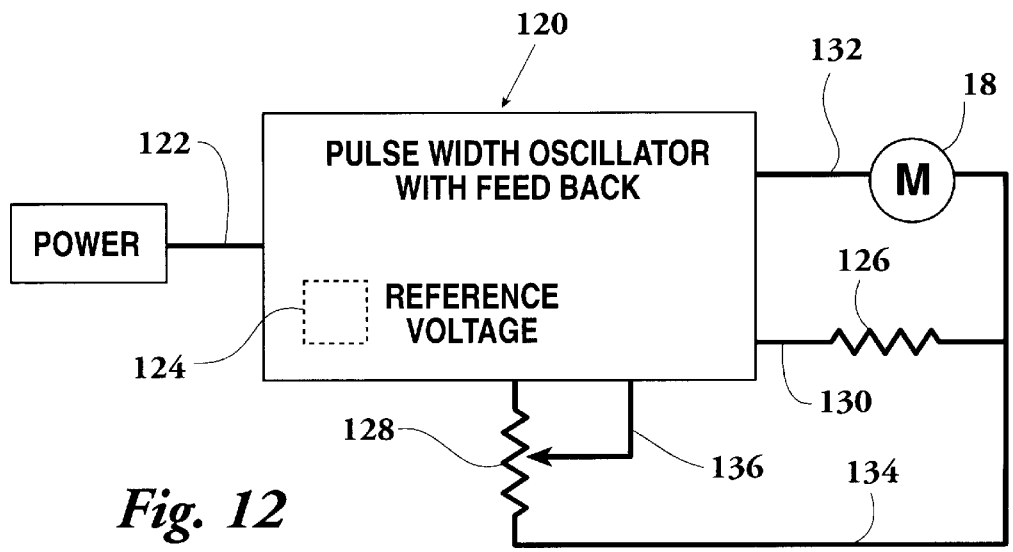
FIG. 12 is a schematic of a system for controlling the speed of the travel motor on the welding bug.
Figure 13:
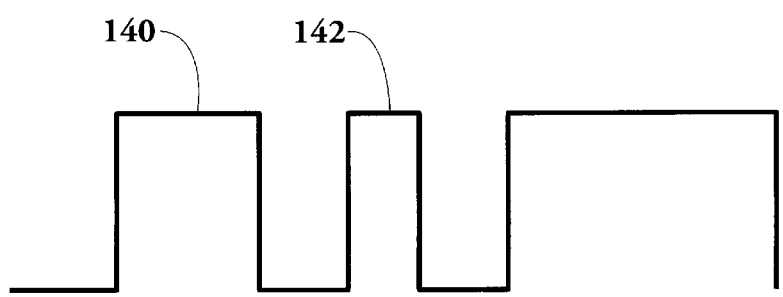
FIG. 13 illustrates pulses in the control system of FIG. 12.

Attention is next directed to FIG. 12 which shows one control means in schematic form for use in controlling the speed of travel motor 18. (The illustrated system may also be used to control the speed of wire feed motor 24.) It includes a pulse width oscillator 120 which has a power input 122. The pulse width oscillator 120 has a reference voltage 124 which typically is 2½ volts. The power circuit 132 connects to motor 18. The speed of motor 18 varies as a function of the voltage of the current on line 132. The outlet of the motor is provided through line 134 and variable resistor 128 back to oscillator 120. There is a feedback line 130 from lines 134 to the oscillator 120. This has a resistance 126 and provides a minute feedback to oscillator 120. Resistor 128 can be varied to change the speed of motor 18 (as by moving knob on potentiometer 22). As the resistance of resistor 128 is varied, the output voltage varies on line 132. This voltage on line 130 is then compared to the oscillator reference voltage 124. The width of the pulses 140, 142 shown in FIG. 13 changes until the minute feedback on line 130 equals the reference voltage. This will then control the speed of motor 18. One skilled in the art could easily implement this speed control system from the above schematic drawing and explanation. Other means of providing this motor control speed may be used.

FIGS. 4 and 5 illustrate potentiometer welding bug travel speed control knob 26A and wire drive speed control knob 26A mounted on control box 27. These knobs can be used in cooperation with the control of FIG. 2 to adjust either or both of the speed of the bug travel motor or the wire feed motor. Control conduits 147 and 149 connect the control box 27 respectively to travel motor 18 and wire feed motor 24.

Having described the principal components of the invention, attention will now be directed briefly at the operation thereof. In operation, the ends of pipe sections 10 and 12 will be placed adjacent each other, as shown in FIG. 1. A track 14 is connected about the pipe section 12. The STT power source 31 is connected to pipeline tractor generator 33 to provide the power for the welding operation.

Track 14 is set so the welding tip 29 is positioned properly with respect to the gap between pipe sections 10 and 12. Normal adjustments will be made to the height and oscillation of welding head 30.

Carbon dioxide solenoid 80 is then energized to open up the $CO_2$ supply source so that the $CO_2$ can be transported to the welding head 30. Now the travel motor 18 and wire feed motor 24 will be started essentially simultaneously after the wire tip 29 is in proper position.

The initial or root pass of the welding operation is made on the outside of the pipe in the position shown in FIG. 1. The use of the surface-tension-transfer (STT) power source 31 is most essential. The STT power source operates neither in the constant current (CC) or constant voltage (CV) mode. Rather, it is a high frequency (wide-band-width), current-controlled machine wherein the power to the arc is based on the instantaneous arc requirements, not on an "average DC voltage". It is a power source which has the capability of delivering and changing electrode current in the order of microseconds.

As the travel motor causes the welding bug 16 to progress around track 14, the operator closely watches the welding puddle to keep the welding tip 29 just ahead of the puddle. As the welding bug 16 moves downwardly, the force of gravity causes the welding puddle to want to move faster. Therefore, the welding operator will merely turn a knob 22A as shown in FIG. 4 to adjust the speed as required. The operator can also adjust the speed of the wire feed motor 24 by adjusting knob 26A as shown in FIG. 4. This is done without stopping either the travel motor 18 or the wire feed motor 24. There is another welding head (not shown) which is on the other side of the pipe from that viewed in FIG. 1. The second operator will operate that welding bug in the same manner as just described. One of the bugs will start slightly before the other, so that there will be no gap at the top where the welding beads begin; and one of the bugs will stop before the other so that the one bug can continue the welding bead until it is continuous at the bottom. This operation is all from the outside of the pipe. There is no protrusion into the pipe of drippings and the like because of this new system described herein. There is no need for the root pass to be made on the inside. This eliminates a very costly procedure. After the root pass has been made, then additional welding passes may be made using conventional welding techniques as desired.

Figure 17:
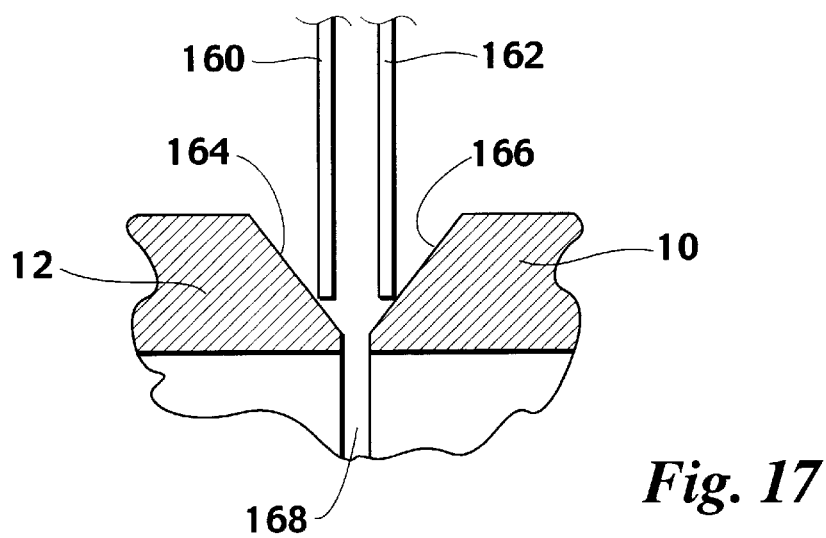
FIG. 17 is an isolated view showing the typical positions of the dual welding wires in relation to the ends of pipe.

Attention is next directed to FIG. 17 which shows dual welding wires 160 and 162. The ends of welding wire tips 160 and 162 are approximately positioned adjacent the bevels 164 and 166 respectively of pipe 12 and 10. There is normally a slight gap 168, which typically may be about 0.063 inches, between pipes 10 and 12. Wire 160 is on one side of gap 168 and wire 168 is on the other side. The exact position would be in accordance with good welding procedures and in general would be guided by having the wires positioned with respect to the bevels on the ends of the pipes to get good coverage and proper filling of the gap 168. The dual wire arrangement is especially useful if gap 168 is irregular or if one end of one pipe is high or low with respect to the other end. Both of these wires 160 and 162 are powered by the same power source such as STT power source 31 illustrated in FIG. 1.

Figure 14:
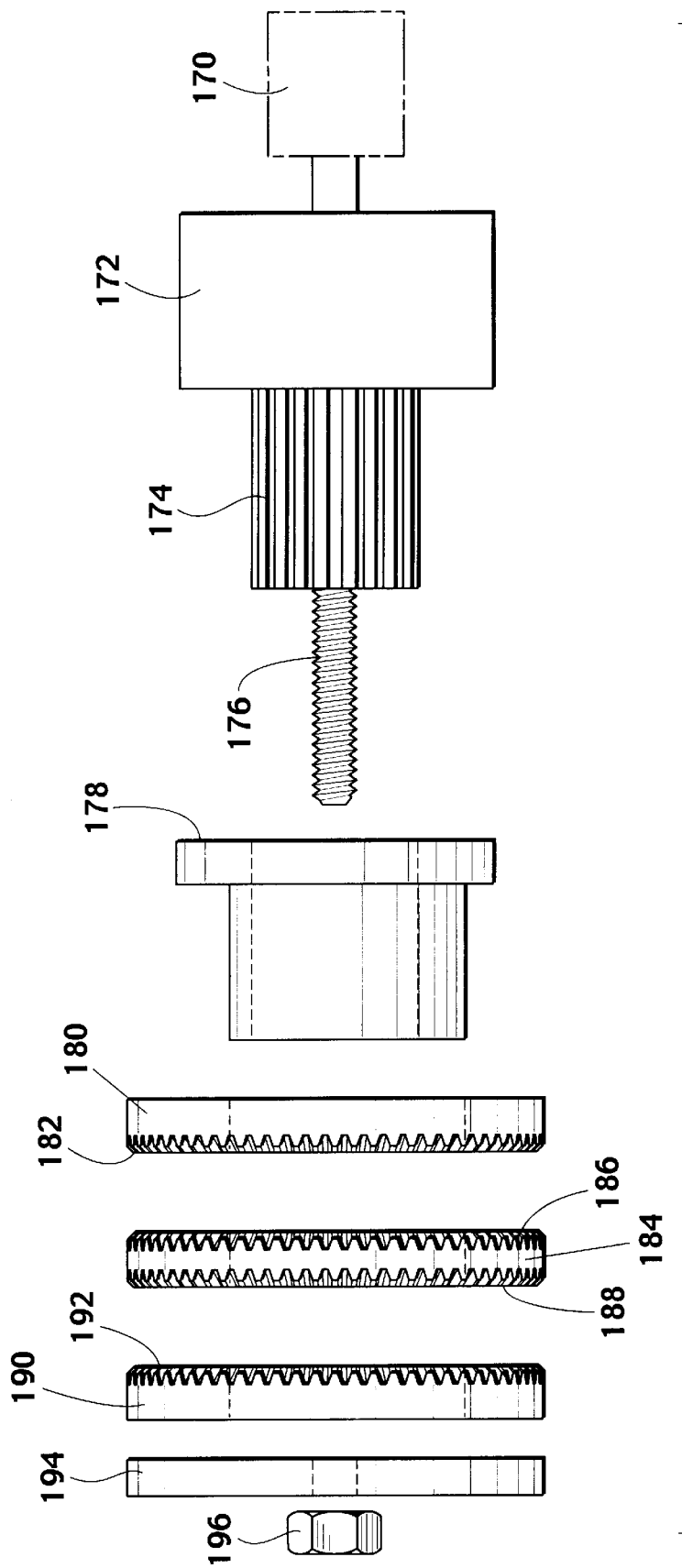
FIG. 14 is a front elevation exploded view of the dual wire feeding system.
Figure 15:
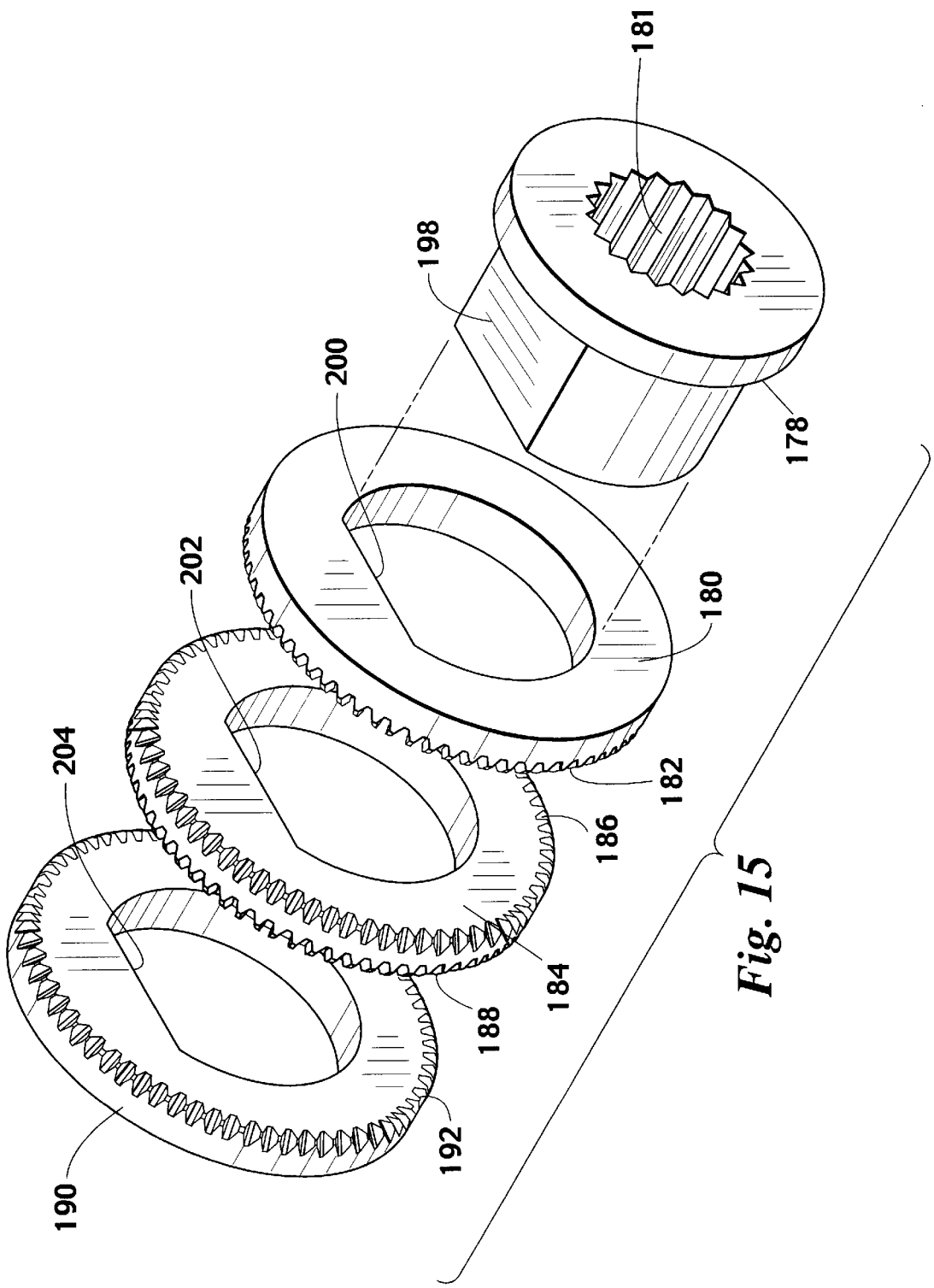
FIG. 15 is an isometric exploded view of the dual wire driving gears.

Attention is next directed to FIG. 14 which shows an exploded view of the dual wire feeder and drive motor. Shown in FIGS. 14 and 15 is the wire driving mechanism. Shown in FIG. 15 is D-shaped drive hub 178 having a flat surface 198, end feeder wire drive gear 180 having gear teeth 182 and a flat surface 200 which mates with flat surface 198. Also shown is a middle wire feeder gear 184 having wire drive gears 186 on one side and wire drive gears 188 on the other side and it too has a flat surface 202 also to be driven by hub 178 and also matches the flat surface 198. Outer wire feeder gear 190 has feeder wire gears 192 and it also has a flat surface 204. The flat surface 198 of D hub 178 is insertable into the holes in the gears and surface 198 mates with flat surface 200, 202 and 204 so that rotation of hub 178 rotates the gears 180, 184 and 190 in unison. Hub 178 has a hole in the outer end thereof and has internal ribs or gears 180.

I shall now discuss the power source for rotating hub 178. This is shown in FIG. 14 and includes wire feeder motor 170 which is attached to gear box 172. Gear box 172 has drive gears 174 which mate with internal gears 180 of hub 178. Wire gears 174 has integral therewith a threaded bolt 176. There is a nut 196 which is threadable onto threaded bolt 176.

When assembled, the hub 178 extends through the gears 180, 184 and 190 and threaded bolt 176 extends through the hub and the three gears through washer 194 where the nut 196 is tightened onto the threaded bolt 176. During this operation the drive gears 174 fit neatly into the opening of hub 178 and mesh with the internal gears 181. Thus rotation of wire feeder motor 170 causes rotation of the wire drive gears 180, 184 and 190.

Figure 16:
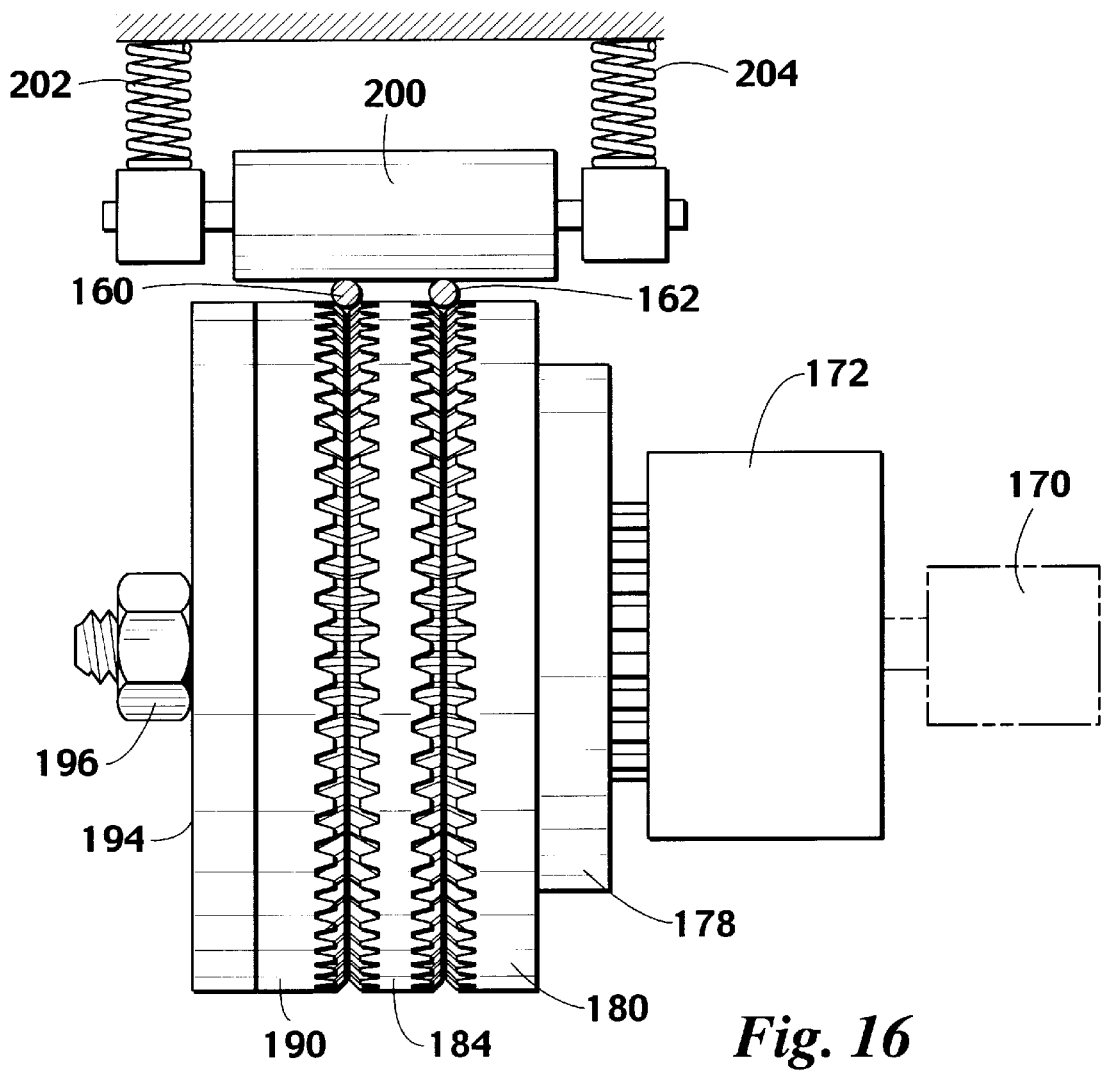
FIG. 16 is a partial view of the feeder gears with a spring loaded roller holding the wires to the gears.

Attention is next directed to FIG. 16 which shows the welding wire 160 as positioned between the outer wire feeder gear 192 and the wire feeder gear 188 on the middle feeder wire gear 184 and wire 162 is positioned between the bears 186 and 182 of end feeder wire gear 180. The wires 160 and 162 are held in position by a roller 200 which is spring loaded by springs 202 and 204 in any well known manner. This holds the wire 160 and 162 in position with respect to the gears 188 and 192 and to gears 182 and 186 so that the gears will pull the wires and drive them simultaneously at the same rate of speed. Thus I have an apparatus for driving two welding wires 160 and 162 at the same speed simultaneously by a single wire feeder 170. These two wires 160 and 162 are powered by the same welding power sources such as STT power source 32. By using two welding wires 160 and 162 1 can eliminate the welding wire oscillating feature as the spacing and positioning of the wire will be adjusted to obtain good coverage of gap 168.

The dual welding wire feeder shown in FIGS. 14, 15, 16 and 17 for this embodiment replaces the single wire feeder of the embodiment shown in FIG. 1.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method of welding the end of a first pipe to the end of a second pipe by use of a welding bug having a welding wire feeder capable of feeding two welding wires simultaneously at the same speed and means for driving the bug along a track on the outside periphery of pipe which comprises:

continuously moving said bug along said track;

applying the initial welding pass to the adjacent ends of said first and second pipe from outside said first and second pipe without use of internal line-up clamps with back-up shoes and using dual welding wires to form a puddle between the ends of the pipe;

during said initial pass varying the speed of said welding bug without regard to the angular position of the welding head and without stopping it while it is continuously moving about said track on said pipe to maintain the ends of the welding wires at a desired position with respect to the welding puddle.

2. A method as defined in claim 1 in which after the initial pass applying additional passes.

3. A method as defined in claim 1 in which said initial pass is made by using a single surface-tension-transfer power source in said initial welding pass to supply power to each welding wire.

4. A method as defined in claim 3 in which the power source has the capability of delivering and changing electrode current in the order of microseconds.

5. A method as defined in claim 4 in which the speed of wire discharged by said welding wire feeder is a function of the speed of the means for driving the bug around the track.

6. A method as defined in claim 1 including varying the speed of said bug in response to an observation of the welding puddle as the welding bug is moving about the periphery such that the welding wires are just ahead of the puddle.

7. An apparatus for welding one end of a first pipe to a first end of a second pipe which comprises:

a welding tractor;

a power generator on and powered by said tractor;

a surface-tension-transfer (STT) power source connected to said power generator;

a welding bug including a dual wire feeder, a welding head, and means to guide said bug around the periphery of said pipe;

connection means for connecting the welding head of said bug to said STT power source;

manual speed control means, independent of any angular position of the welding bug, for remotely varying the speed of said welding bug as it moves about said track on said pipe.

8. An apparatus as defined in claim 7 including means for varying the rate at which said wires are fed from said wire feeder as a function of the speed of said welding bug.

9. A method of welding the end of a first pipe to the end of a second pipe by use of a welding bug having a welding wire feeder for supplying two welding wires and means for driving the bug along a track on the outside periphery of pipe which comprises:

positioning the ends of the first and second pipe in close proximity to one another to have an unobstructed gap therebetween;

continuously moving said bug along said track;

applying the initial welding pass to the adjacent ends of said first and second pipe from outside said first and second pipe while simultaneously driving two welding wires with one wire directed at the end of the first pipe and the second welding wire directed to the second pipe;

varying the speed of said welding bug without stopping it while it is continuously moving about said track on said pipe to maintain a desired position of the welding wires with the welding puddle;

when applying the initial welding pass using power from a surface-tension-transfer power source.

10. A method of welding a first pipe to the end of a second pipe by use of a welding bug having a welding wire feeder feeding two welding wires and means for driving the bug along a track on the outside periphery of said pipe which comprises:

connecting the welding bug to a STT power source, continuously moving said bug along said track, applying the initial welding pass to the adjacent ends of said first and second pipe from outside said first and second pipe, observing the end of the welding wire in relation to the welding puddle, varying the speed of said welding bug without stopping it while it is continuously moving about said track on said pipe to keep the ends of the welding wire just ahead of the puddle.

11. A method as defined in claim 10 in which the ends of the pipe each has a bevel and positioning one welding wire adjacent the bevel on one pipe and the other welding wire adjacent the bevel on the end of the second pipe and in which the two welding wires are connected to a single STT power source.

12. An apparatus for welding one end of a first pipe to a first end of a second pipe which comprises:

a welding tractor;

a power generator on and powered by said tractor;

a surface tension transfer (STT) power source connected to said power generator;

a welding bug including a dual welding wire feeder, including a wire feeder motor and in which both welding wires are driven by the same wire feeder motor, a welding head, and means to guide said bug around the periphery of said pipe;

connecting means for connecting the welding head of said bug to said STT power source such that each welding wire is connected to the same STT power source;

speed control means for remotely varying the speed of said welding bug as it moves about said tracks on said pipe;

means for varying the rate at which said wire is fed from said wire feeder.

13. A method of welding the end of a first workpiece to the end of a second workpiece by use of a welding bug having a welding wire feeder and a mechanism to drive the welding bug along a track on the outside periphery of workpiece which comprises:

a. continuously moving said bug along said track during said welding;

b. applying the initial welding pass to the adjacent ends of said first and second workpiece from outside said first and second workpiece and using a welding wire fed to said workpiece to form a puddle between the ends of the workpiece; and c. during said initial pass varying the speed of said welding bug or the feed rate of said welding wire without stopping said welding bug while said welding bug is continuously moving about said track on said workpiece to maintain the end of the welding wire ahead of the welding puddle.

14. A method as defined in claim 13, in which after the initial pass applying additional passes.

15. A method as defined in claim 13, in which said initial pass is made by using a surface-tension-transfer (STT) power source in said initial welding pass.

16. A method as defined in claim 15, in which the power source has the capability of delivering and changing electrode current in the order of microseconds.

17. A method as defined in claim 15, in which the end of the welding wire is observed in relation to said welding puddle.

18. A method as defined in claim 15, including varying the speed of said bug in response to an observation of the welding puddle as the welding bug is moving about the periphery such that the welding wire is ahead of the puddle.

19. A method as defined in claim 18, in which the speed of wire discharged by a welding wire feeder is varied and the speed of said welding bug is varied.

20. A method as defined in claim 19, in which the speed of wire discharged by a welding wire feeder is a function of the speed of the welding bug around the track.

21. A method as defined in claim 19, in which the speed of the welding bug is remotely varied.

22. A method as defined in claim 19, in which the height of said welding head from said first and second pipe ends is adjustable.

23. A method as defined in claim 22, in which the angle of said welding head relative to said first and second workpiece ends is adjustable.

24. A method as defined in claim 23, in which a plurality of bugs weld together said first and second workpiece ends.

25. A method as defined in claim 24, wherein said welding bug feeding two welding wires at substantially the same time.

26. A method as defined in claim 25, wherein said welding bug including a welding wire feed mechanism to feed said two welding wires at substantially the same speed.

27. A method as defined in claim 26, wherein said two welding wires form a puddle between the ends of said workpiece and one wire is fed at least closely adjacent to the end of said first workpiece and the second wire is fed at least closely adjacent to the end of said second workpiece.

28. A method as defined in claim 19, in which the angle of said welding head relative to said first and second workpiece ends is adjustable.

29. A method as defined in claim 19, wherein said welding bug feeding two welding wires at substantially the same time.

30. A method as defined in claim 13, in which the end of the welding wire is observed in relation to said welding puddle.

31. A method as defined in claim 13, including varying the speed of said bug in response to an observation of the welding puddle as the welding bug is moving about the periphery such that the welding wire is ahead of the puddle.

32. A method as defined in claim 13, in which the speed of wire discharged by a welding wire feeder is varied and the speed of said welding bug is varied.

33. A method as defined in claim 13, in which the speed of wire discharged by a welding wire feeder is a function of the speed of the welding bug around the track.

34. A method as defined in claim 13, in which the speed of the welding bug is remotely varied.

35. A method as defined in claim 13, in which said initial welding pass formed without use of internal line up clamps with back-up shoes.

36. A method as defined in claim 13, in which said welding head is oscillated between said first and second workpiece ends.

37. A method as defined in claims 36, in which the width of said oscillations is adjustable.

38. A method as defined in claim 13, in which the height of said welding head from said first and second pipe ends is adjustable.

39. A method as defined in claim 13, in which an inert gas is applied to said welding head during the formation of said welding puddle.

40. A method as defined in claim 13, in which the angle of said welding head relative to said first and second workpiece ends is adjustable.

41. A method as defined in claim 13, in which a plurality of bugs weld together said first and second workpiece ends.

42. A method as defined in claim 13, in which the speed of said welding bug is varied without regard to the position of the weld head on said workpiece.

43. A method as defined in claim 13, wherein said welding bug feeding two welding wires at substantially the same time.

44. A method as defined in claim 43, wherein said welding bug including a welding wire feed mechanism to feed said two welding wires at substantially the same speed.

45. A method as defined in claim 43, wherein said two welding wires form a puddle between the ends of said workpiece and one wire is fed at least closely adjacent to the end of said first workpiece and the second wire is fed at least closely adjacent to the end of said second workpiece.

46. A method as defined in claim 43, in which said welding head is oscillated between said first and second workpiece ends.

47. A method as defined in claim 46, in which the width of said oscillations is adjustable.

48. An apparatus for welding one end of a first workpiece to a first end of a second workpiece which comprises:
   a. a welding tractor;
   b. a power generator on and powered by said tractor;
   c. a surface-tension-transfer (STT) power source connected to said power generator;
   d. a welding bug including a wire feeder, a welding head, and a mechanism to guide said welding bug around the periphery of said workpiece;
   e. a connector to connect the welding head of said bug to said STT power source; and
   f. a speed controller to continuously move the welding bug about said track on said workpiece during the formation of the weld, said speed controller controlling the speed of said welding bug during said weld formation.

49. An apparatus as defined in claim 48, including a mechanism to varying the speed of said welding bug as the welding bug moves about the periphery of said workpiece.

50. An apparatus as defined in claim 49, wherein the speed of said welding bug is remotely varied.

51. An apparatus as defined in claim 49, wherein said wire feeder varies the speed of said wire fed by said wire feeder.

52. An apparatus as defined in claim 51, wherein the speed of wire discharged by said wire feeder is a function of the speed of the welding bug around said track.

53. An apparatus as defined in claim 52, including a mechanism to oscillate said welding head between said first and second workpiece ends.

54. An apparatus as defined in claim 53, wherein the width of said oscillations is adjustable.

55. An apparatus as defined in claim 54, including a mechanism to adjust the height of said welding head from said first and second workpiece ends.

56. An apparatus as defined in claim 55, including a mechanism to adjust the height of said welding head from said first and second workpiece ends.

57. An apparatus as defined in claim 56, including a plurality of welding bugs.

58. An apparatus as defined in claim 56, wherein said welding bug including two wire feeders to feed welding two wires.

59. An apparatus as defined in claim 58, wherein said two wire feeders feeding said two welding wires at substantially the same speed and at substantially the same time.

60. An apparatus as defined in claim 59, wherein said welding bug positions said two welding wires to form a puddle between said ends of said workpiece, the end of one of said welding wires is positioned at least closely adjacent to the end of said first workpiece and the end of the second of said welding wires is positioned at least closely adjacent to the end of said second workpiece.

61. An apparatus as defined in claim 49, including a mechanism to adjust the height of said welding head from said first and second workpiece ends.

62. An apparatus as defined in claim 49, including a mechanism to adjust the height of said welding head from said first and second workpiece ends.

63. An apparatus as defined in claim 49, wherein said welding bug including two wire feeders to feed welding two wires.

64. An apparatus as defined in claim 48, wherein said wire feeder varies the speed of said wire fed by said wire feeder.

65. An apparatus as defined in claim 48, wherein the speed of wire discharged by said wire feeder is a function of the speed of the welding bug around said track.

66. An apparatus as defined in claim 48, including a mechanism to oscillate said welding head between said first and second workpiece ends.

67. An apparatus as defined in claim 66, wherein the width of said oscillations is adjustable.

68. An apparatus as defined in claim 48, including a mechanism to adjust the height of said welding head from said first and second workpiece ends.

69. An apparatus as defined in claim 48, including inert gas applied to said welding head during the formation of a weld.

70. An apparatus as defined in claim 48, including a mechanism to adjust the angle of said welding head relative to said first and second workpiece ends.

71. An apparatus as defined in claim 48, including a plurality of welding bugs.

72. An apparatus as defined in claim 48, wherein said welding bug including two wire feeders to feed welding two wires.

73. An apparatus as defined in claim 72, wherein said two wire feeders feeding said two welding wires at substantially the same speed and at substantially the same time.

74. An apparatus as defined in claim 72, wherein said welding bug positions said two welding wires to form a puddle between said ends of said workpiece, the end of one of said welding wires is positioned at least closely adjacent to the end of said first workpiece and the end of the second of said welding wires is positioned at least closely adjacent to the end of said second workpiece.

75. A dual welding wire feeder to drive a first welding wire and a second welding wire for use in welding comprising:

an end feeder wire portion having a set of teeth;

an outer end feeder wire portion having a set of teeth;

a middle wire feeder portion positioned between said end feeder wire portion and said other end feeder wire portion, said middle wire feeder portion having two sets of teeth;

a drive hub having a wire feeder portion engagement surface that is telescopically received in said end feeder wire portion, said outer end feeder wire portion and said middle wire feeder portion, said engagement surface having a non-circular cross-sectional shape;

said first welding wire positioned between said end feeder wire portion and said middle wire feeder portion and said second welding wire positioned between said other end feeder wire portion and said middle wire feeder portion; and a drive source connected to said drive hub to simultaneously drive said end feeder wire portion, said outer end feeder wire portion and said middle wire feeder portion such that said first welding wire and said second welding wire are simultaneously driven.

76. A dual welding wire feeder as defined in claim 75, including a single STT power source connected to said first wire and to said second wire for supplying welding current thereto.

77. A dual welding wire feeder as defined in claim 75, wherein said first welding wire and said second welding wire are driven at substantially the same rate of speed.

78. A method of welding the end of a first workpiece to the end of a second workpiece by use of a welding bug having a dual welding wire feeder for a first and a second welding wire and a mechanism to drive the welding bug along a track on the outside periphery of the workpiece, which comprises:

continuously moving said welding bug along said track;

connecting the welding bug to a STT power source; and applying the initial welding pass to the adjacent ends of said first and second workpiece from outside said first and second workpiece using two welding wires to form a puddle between the ends of said workpiece and positioning the end of one wire at least closely adjacent the end of the first workpiece and positioning the end of the second welding wire at least closely adjacent the end of the second workpiece.

* * * * *

UNITED STATES PATENT AND TRADEMARK OFFICE
CERTIFICATE OF CORRECTION

PATENT NO. : 5,981,906
DATED : November 9, 1999
INVENTOR(S) : William David Parker It is certified that error appears in the above-identified patent and that said Letters Patent is hereby corrected as shown below:

Column 11, line 19, in claim 22 substitute "workpiece" for --pipe--.

Column 11, line 66, in claim 38 substitute "workpiece" for --pipe--.

Signed and Sealed this

Sixth Day of June, 2000

Attest:

Q. TODD DICKINSON

Attesting Officer

Director of Patents and Trademarks